March 3, 1959 P. M. BILLINGS 2,876,402

ELECTRICAL MOUNTING DEVICE

Filed June 4, 1954

Philip M. Billings
*INVENTOR.*

BY [signature]

*ATTORNEY*

2,876,402

ELECTRICAL MOUNTING DEVICE

Philip M. Billings, Derry, N. H., assignor, by mesne assignments, to Sanders Associates, Inc., Nashua, N. H., a corporation of Delaware Application June 4, 1954, Serial No. 434,543

9 Claims. (Cl. 317—242)

This invention relates to composite electrical component units and to improvements in the construction and manufacture thereof.

The invention is especially useful in connection with mechanized production systems for apparatus of the type described. In copending application of Royden C. Sanders Jr., Serial No. 397,226, filed December 9, 1953, there is described certain improved electrical apparatus embodying electrical components, such as are used in the systems referred to.

An object of the present invention is to provide an improved electric composite unit embodying electrical components which are useful in systems of the character described.

A further object of the invention is to provide an improved composite electrical unit having a retaining member for carrying a plurality of electric components and being so constructed as to present a compact assembly unit which is both economical and of precise construction.

Other and further objects of the invention will be apparent from the following description of a preferred embodiment thereof, taken in connection with the accompanying drawings.

In accordance with the present invention, there is provided a composite electrical component mounting device. The device has only a single retaining member consisting essentially of a single flat insulating panel having a plurality of integrally formed fingers extending from one narrow side thereof. A plurality of integrally-formed, supporting, tab projections extend from the opposite narrow side thereof. A plurality of flat capacitor elements, each having a dielectric member sandwiched between a pair of conductive side members are disposed between the fingers of the retaining member at right angles thereto. Thin plane finger conductors are carried by the fingers. Metallic connections are provided between each conductive side member and a conductor of an adjacent finger of a retaining member. Thin plane conductors are disposed in the opposite wide sides of the retaining member and selectively connect the tabs in the finger conductors to provide the composite mounting device.

Figure 1:
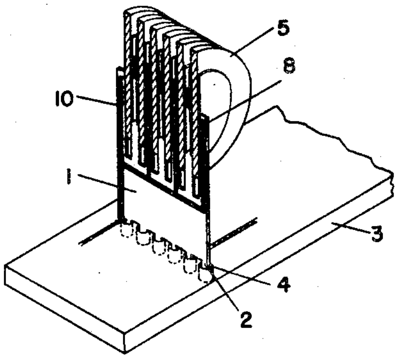
Fig. 1 is a three-dimensional view, partly in section, of a composite electrical component unit embodying the present invention.

Referring now in more detail to the drawings, the composite unit of Fig. 1 comprises a flat retaining member 1 formed of an insulating or plastic material such as XXXP-Phenolic. Formed on the retaining member 1 are a plurality of tab extensions 2 adapted to extend into suitable orifices or sockets 4 in the supporting member 3. Disposed along the upper edge of the retaining member are a plurality of capacitors 5. In other embodiments of the invention the component units may be any other type of electrical components such as resistors, inductors, transistors and the like.

Figure 2:
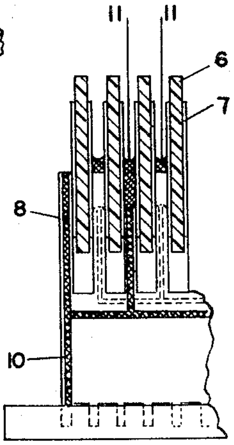
Fig. 2 is an enlarged elevated side view, partly in section, of a portion of the unit in Fig. 1.

As shown in Fig. 2, the capacitor plates are formed by a silver coating 7 on all flat surfaces of the ceramic disks 6. Integrally formed on the retaining member and extending from its upper edge are a plurality of projections 8, which extend between and on opposite sides of the capacitor plates, as shown.

Intra-capacitor connections are effected by solder joints 11, which also effect electrical and mechanical connections between the capacitors 5 and the retaining member 1. The capacitors 5 are connected electrically by means of conductive paths 10 on the flat surfaces of the retaining member 1. The exposed conductive paths are cross-hatched as shown.

Figure 3:
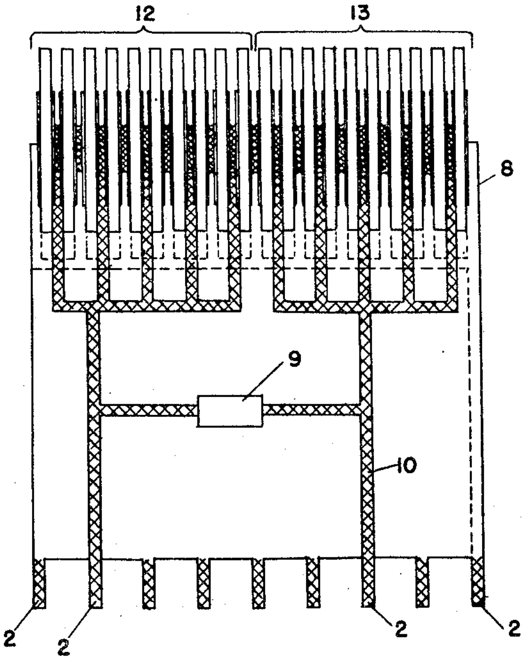
Fig. 3 is an enlarged elevated side view of a preferred embodiment of the invention.
Figure 4:
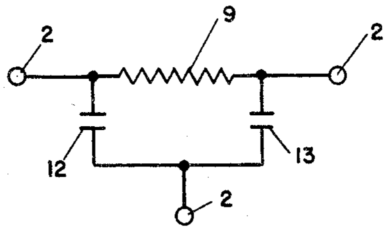
Fig. 4 is a schematic circuit diagram of the embodiment of Fig. 3.

The embodiment of Fig. 3, as shown, comprises a low-pass filter as is schematically illustrated in Fig. 4. A capacitor 12 is formed of a group of ceramic disk capacitors connected in parallel, as shown. One set of plates of the capacitor 12 are connected together to a resistor 9. The other side of the resistor 9 is connected to one side of a capacitor 13 comprising the remaining disk capacitors connected together as shown. The other sides of the capacitors 12 and 13 are connected together.

Figure 5:
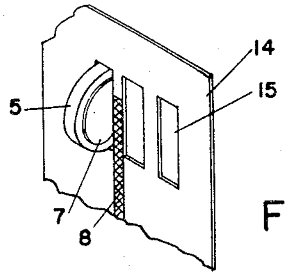
Fig. 5 is a three-dimensional fragmentary view of another embodiment of the present invention.
Figure 6:
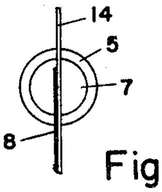
Fig. 6 is a fragmentary side elevated view of the embodiment of Fig. 5.

Referring now to Figs. 5 and 6, a disk capacitor 5 is shown inserted in a slot 15 to illustrate another embodiment of the present invention.

The unit as described may be manufactured with great facility. Retaining members 1 may be formed simultaneously from continuous sheets of plastic material. By well-known techniques such as photoetching, silk screening, etc., electrical connections may be affixed thereto. The retaining unit and the capacitors may be readily joined mechanically and electrically by immersing the unit in a solution of molten solder.

Cross-over connections are readily accomplished by forming one system of conductive paths on one side of the retaining member and a separate system on the other side. A large range in capacity may be effected in a relatively small space.

The easy and economy of manufacturing electrical apparatus is greatly enhanced by the present invention.

While there has been hereinbefore described what is at present considered a preferred embodiment of the invention, it will be apparent that many and various changes and modifications may be made with respect to the embodiment illustrated, without departing from the spirit of the invention. It will be understood, therefore, that all those changes and modifications as fall fairly within the scope of the present invention, as defined in the appended claims, are to be considered as a part of the present invention.

What is claimed is:

1. A composite electrical component unit having only a single retaining member consisting essentially of a single flat insulating panel, and comprising: a plurality of flat condenser elements disposed along one edge of said retaining member at right angles thereto; a plurality of extensions formed on said member and securing said condenser elements in fixed spaced positions at right angles to said member to form said composite unit.

2. A composite electrical component unit having only a single retaining member consisting essentially of a single, flat, insulating panel adapted to be secured along one of its edges to a supporting surface, and comprising: a plurality of electrical components disposed along another of its edges; and a plurality of integrally formed fingers extending from said other edge on said member holding said components in fixed spaced positions along said edge at right angles to said retaining member.

3. A composite electrical component unit having only a single retaining member consisting essentially of a single flat insulating panel, and comprising: a plurality of projections formed along one edge of said member for securing it to a supporting surface; a plurality of electrical components disposed along another of its edges; and a plurality of fingers extending from said other edge for holding said components in fixed spaced positions along said edge normal to said retaining member.

4. A composite electrical component unit having only a single retaining member consisting essentially of a single flat insulating panel adapted to be secured along one of its edges to a supporting surface, and comprising: a plurality of condensers disposed along another of its edges normal to said retaining member having dielectric elements disposed between conductive side members; and projections extending from said other edge of said retainer member between said condensers for holding said condenser in fixed spaced positions along said edge normal to said retaining members and providing electrical connections therefor.

5. A composite electrical component unit having only a single retaining member consisting essentially of a single flat insulating panel, and comprising: a plurality of condensers having dielectric elements between conductive side members and disposed along one edge of said retaining member at right angles thereto; a plurality of fingers extending from said retainer members between said condensers and securing said condensers in fixed spaced positions at right angles to said edge; and metallic connections between the opposing outer surfaces of said condensers and the adjacent finger of said retainer member.

6. A composite electrical component unit having only a single retaining member consisting essentially of a single flat insulating panel, and comprising: a plurality of paths of conductive material formed on its surface; a plurality of flat condensers disposed along one edge of said retaining member normal to said member; a plurality of fingers extending from said retaining member, securing said condensers in fixed spaced positions and connecting said condensers with said conductive paths.

7. A composite electrical component unit having only a single retaining member consisting essentially of a single flat insulating panel adapted to be secured along one of its edges to a supporting surface, and comprising: a plurality of slots formed in said member; a plurality of flat disc-shaped electrical components disposed in said slots normal to said retaining member; and conductive path means affixed to said member interconnecting said components.

8. A composite electrical, component-mounting device, having only a single retaining member consisting essentially of a single flat insulating panel having a plurality of integrally-formed fingers extending from one narrow side thereof and a plurality of integrally-formed, supporting, tab projections extending from the opposite narrow side thereof and comprising: a plurality of flat capacitor elements each having a dielectric member sandwiched between a pair of conductive side members and disposed between said fingers of said retaining member at right angles thereto; thin, plane finger conductors carried by said fingers; metallic connections between each said conductive side member and a conductor of an adjacent finger of said retaining member; and thin, plane conductors disposed on the opposite wide sides of said retaining member and selectively connecting said tabs and said finger conductors to provide said composite mounting device.

9. A composite electrical, component-mounting device, having only a single retaining member consisting essentially of a single flat insulating panel having a plurality of integrally-formed fingers extending from one narrow side thereof and a plurality of integrally-formed, supporting, tab projections extending from the opposite narrow side thereof and comprising: a plurality of flat capacitor elements each having a dielectric member sandwiched between a pair of conductive side members and disposed between said fingers of said retaining member at right angles thereto; thin, plane conductors carried by said fingers; metallic connections between each said conductive side member and the conductor of an adjacent finger of said retaining member; and thin, plane conductors disposed on the opposite wide sides of said retaining member and selectively connecting said finger conductors in parallel and to said tabs to provide said composite mounting device with a single, high-capacity capacitor.

References Cited in the file of this patent

UNITED STATES PATENTS 2,472,747 Jones ------------------ June 7, 1949

OTHER REFERENCES

APC application of H. Zodtner Serial No. 397,677, published May 18, 1943.